United States Patent
Kim

(10) Patent No.: US 10,872,289 B2
(45) Date of Patent: Dec. 22, 2020

(54) METHOD AND SYSTEM FOR FACILITATING CONTEXT BASED INFORMATION

(71) Applicant: Geun Il Kim, Woodinville, WA (US)

(72) Inventor: Geun Il Kim, Woodinville, WA (US)

( * ) Notice: Subject to any disclaimer, the term of this patent is extended or adjusted under 35 U.S.C. 154(b) by 234 days.

(21) Appl. No.: 15/690,149

(22) Filed: Aug. 29, 2017

(65) Prior Publication Data

US 2018/0293281 A1    Oct. 11, 2018

Related U.S. Application Data

(60) Provisional application No. 62/483,326, filed on Apr. 8, 2017.

(51) Int. Cl.
| | |
|---|---|
| *G06N 3/00* | (2006.01) |
| *G06F 16/2457* | (2019.01) |
| *G06F 16/14* | (2019.01) |
| *G06F 16/16* | (2019.01) |
| *G06F 16/435* | (2019.01) |
| *G06Q 30/02* | (2012.01) |
| *G06Q 50/00* | (2012.01) |

(52) U.S. Cl.
CPC ........... *G06N 3/006* (2013.01); *G06F 16/156* (2019.01); *G06F 16/168* (2019.01); *G06F 16/24573* (2019.01); *G06F 16/437* (2019.01); *G06Q 30/02* (2013.01); *G06Q 50/01* (2013.01)

(58) Field of Classification Search
CPC .............. G06F 16/156; G06F 16/168; G06F 16/24573; G06F 16/437; G06F 16/444; G06F 3/011; G06Q 30/02; G06Q 50/01
See application file for complete search history.

(56) References Cited

U.S. PATENT DOCUMENTS

| | | | |
|---|---|---|---|
| 6,500,008 B1 | 12/2002 | Ebersole et al. | |
| 7,395,507 B2 | 7/2008 | Roberts et al. | |
| 9,823,737 B2 * | 11/2017 | Mazed | G06F 3/011 |
| 2002/0069072 A1 | 6/2002 | Friedrich et al. | |
| 2012/0154557 A1 | 6/2012 | Perez et al. | |
| 2012/0242865 A1 | 9/2012 | Vartanian et al. | |
| 2012/0327119 A1 | 12/2012 | Woo et al. | |
| 2012/0330646 A1 | 12/2012 | Galvao de Andrade et al. | |
| 2013/0044128 A1 | 2/2013 | Liu et al. | |
| 2014/0347265 A1 * | 11/2014 | Aimone | G02C 11/10 345/156 |
| 2015/0109338 A1 | 4/2015 | McKinnon et al. | |
| 2015/0286698 A1 * | 10/2015 | Gagnier | G06F 16/284 707/736 |

(Continued)

FOREIGN PATENT DOCUMENTS

| | | | | |
|---|---|---|---|---|
| WO | WO-2017112813 A1 * | 6/2017 | ......... | G06F 17/2785 |

*Primary Examiner* — Diedra McQuitery

(57) ABSTRACT

A method and system for facilitating context based information is disclosed. A collection of user information generated from an application in a computing device of a user is received. The collection of user information includes information generated by a plurality of sensing modules associated with the application. A context based information from the collection of user information is determined. The context based information is generated based at least on a learning profile of the user. The context based information in an augmented reality view through a User Interface (UI) of the computing device in the application is provisioned.

18 Claims, 7 Drawing Sheets

(56) References Cited

U.S. PATENT DOCUMENTS

2018/0189267 A1\* 7/2018 Takiel ................. G06F 16/3329
2018/0190020 A1\* 7/2018 Mullins ................ G06T 19/006
2018/0234545 A1\* 8/2018 Barak ................... H04M 3/527
2018/0276892 A1\* 9/2018 Isaacs .................. G06F 16/904

\* cited by examiner

METHOD AND SYSTEM FOR FACILITATING CONTEXT BASED INFORMATION

TECHNICAL FIELD

The present disclosure generally relates to an augmented reality technology and, more particularly, to a method and system for facilitating context based information using the augmented reality technology.

BACKGROUND

Social interaction is a building block of the society. By interacting with each other, people form relationships, design rules, discover habits and emotions, learn, teach and create institutions. Social interaction has also been shown to help people cope with stress and major life changes. The ability to interact with one another has increased dramatically with the proliferation of technology. For example, a person can reunite with a long lost friend, video chat with a family member living overseas, ask an online doctor for their medical expertise, gather information about a person's relationship status and his/her common interests, or talk to a favourite celebrity about his/her new movie through a variety of social networking websites on the Internet. However, these technological advances also cause people to be distracted, overly stressed, and actually make people increasingly isolated from the real world. This may be because online information and other online tools that people rely on, to communicate, learn, and relate to one another are presented in a vacuum on the Internet through the social media networking websites that may not be available to be accessed when interacting in a real world environment and preferably in real time. Further, simply displaying available online information is not sufficient and quickly becomes distraction in real life interactions.

Therefore, there is a need to provide an effective solution for the above mentioned shortcomings such that a person may be provided with information that is relevant to him/her at the moment. Moreover, it is necessary to analyze context within which the interactions occur and accordingly present the information using the augmented reality technology which can further enhance the interactions.

SUMMARY

Various embodiments of the present disclosure provide methods and system for facilitating context based information.

In an embodiment, a method includes receiving, by a server system, a collection of user information generated from an application in a computing device of a user. The collection of user information includes information generated by a plurality of sensing modules associated with the application. The method further includes determining, by the server system, a context based information from the collection of user information. The context based information is generated based at least on a learning profile of the user. Furthermore, the method includes provisioning, by the server system, the context based information in an augmented reality view through a User Interface (UI) of the computing device in the application.

In another embodiment, a server system includes at least one processor, a communication interface controlled by the at least one processor to communicate with a computing device and a memory. The memory having stored therein machine executable instructions, that when executed by the at least one processor, cause the server system to receive a collection of user information generated from an application in the computing device of a user. The collection of user information includes information generated by a plurality of sensing modules associated with the application. The server system is further caused to determine a context based information from the collection of user information. The context based information is generated based at least on a learning profile of the user. The server system is further caused to provision the context based information in an augmented reality view through the UI of the computing device in the application.

In another embodiment, a method includes facilitating, by a computing device, a collection of user information of a user generated from an application available at the computing device. The application is managed by a server system and the collection of user information includes information generated by a plurality of sensing modules associated with the application. The method further includes facilitating, by the computing device, a user selection of one or more responses on the UI for an interactive learning profile test from the server system. The server system is configured to determine the context based information from the collection of user information based at least on a learning profile of the user. The learning profile corresponds to the one or more responses. Moreover, the method includes receiving, by the computing device, the context based information from the server system. Furthermore, the method includes facilitating, by the computing device, the context based information in an augmented reality view through the UI of the computing device in the application.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

Figure 1:
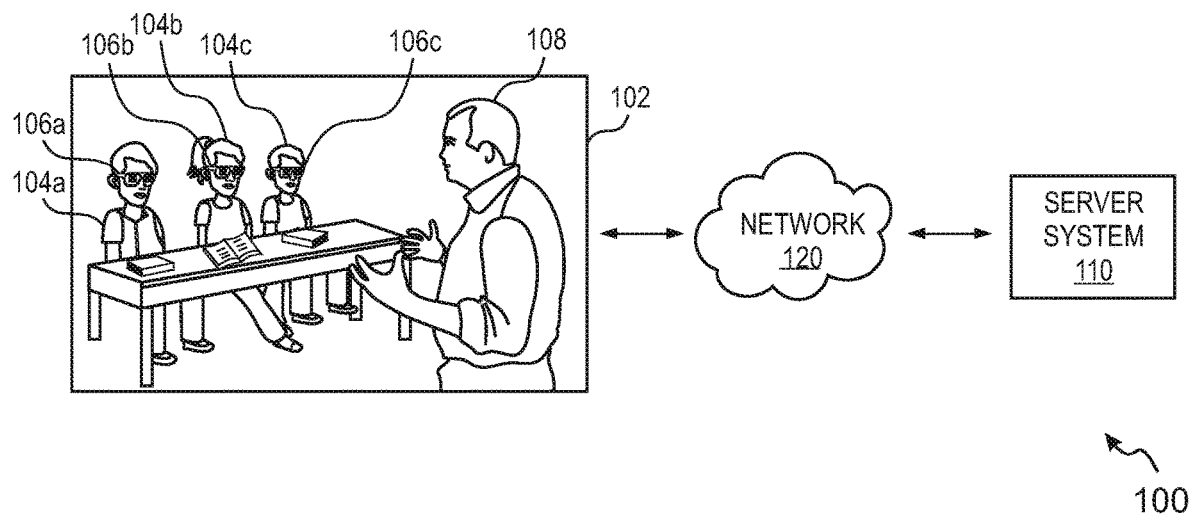
FIG. 1 illustrates an example environment related to at least some embodiments of the present disclosure.

The drawings referred to in this description are not to be understood as being drawn to scale except if specifically noted, and such drawings are only exemplary in nature.

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments disclosed herein provide methods and systems for facilitating context based information. More specifically, a server system causes display of context based information in an augmented reality view through a User Interface (UI) of a computing device associated with a user using an application. The application further facilitates a collection of user information such as, but not limited to, profile data of the user as provide by the user while creating a profile using the application, social network information of the user, information as detected by a plurality of sensing modules associated with the application and the like. The server system is configured to display an interactive learning profile test (hereinafter alternatively referred to as learning profile) on the UI of the computing device to receive one or more user responses which can be used to determine the context based information. The server system is further configured to enable the user to share the context based information with a plurality of users using the application. Moreover, the server system is configured to facilitate creation of an interactive virtual object (hereinafter alternatively referred to as virtual pet) that can be displayed in the augmented reality view through the UI. Various embodiments of the disclosure for facilitating context based information are explained in detail herein with reference to FIGS. 1 to 7.

FIG. 1 illustrates an example environment 100 related to at least some embodiments of the present invention. It should be understood, however, that the environment 100 incorporating a classroom facility 102, illustrated and hereinafter described, is merely illustrative of an arrangement for describing some example embodiments, and therefore, should not be taken to limit the scope of the embodiments.

In the illustrated example representation, the classroom facility 102 depicts a teacher 108 providing an educational lecture to a plurality of users/students such as 104a, 104b and 104c having worn computing devices (e.g., a pair of smartglasses) such as 106a, 106b and 106c, respectively. In various embodiments, the computing devices 106a-c can be any wearable augmented reality computing device such as, but not limited to, Google Glass® or Microsoft HoloLens® headsets or any other similar head-mounted display device. Alternatively or additionally, the computing devices 106a to 106c may be embodied in form of a mobile phone, a computer, a tablet, a virtual reality headset, electronic glasses, contact lenses capable of computer generated sensory input and displaying data, or any other electronic device capable of computer generated sensory input and displaying data.

The environment 100 is further shown depicting a communication network such as a network 120 that connects the computing devices 106a-c to at least one server system such as the server system 110. In an example embodiment, the server system 110 may be a single composite server, or it may have multiple sub-systems. The network 120 may be a centralized network or may include a plurality of sub-networks that may offer a direct or indirect communication between the server system 110 and the computing devices 106a-c. For example, the network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

The server system 110 may correspond to a Web-based platform (for example, a cloud platform) capable of being accessed over the network 120. The Web-based platform may provision an augmented reality (AR) networking application (hereinafter referred to as AR networking application or application) service as a Web service accessible through a Website. In such a scenario, a plurality of users (such as the students 104a-c) may access the Website over the network 120 using Web browser applications installed in their respective computing devices and thereafter use the services of the application.

In at least one example embodiment, the server system 110 may also be configured to store an AR networking application program and provision instances of the application to end-users (such as the students 104a-c or the teacher 108 if he is also using a computing device) for facilitating context based information that is meaningful and helpful in real time interactions. The users/end-users may request the server system 110 to access to the AR networking application over the network 120 using their respective computing devices. The instances of the application may thereafter be downloaded on respective computing devices of the end-users in response to their requests for accessing the application. Alternatively, in some embodiments, the application may be factory installed within the computing devices (such as the computing devices 106a-c) associated with the end-users and, as such, the users may not need to explicitly request the application from the server system 110. Alternatively, the application may be requested by the end-users using their computing devices from a classroom facility server (not shown) which may further communicate with the server system 110 for accessing the application. It is understood that the classroom facility server may be configured to facilitate a private network for the classroom facility 102.

In an example embodiment, based on the requirements of the underlying device platform or operating system being used by the users, multiple AR networking applications may be developed using different technologies. For example, the AR networking application may be implemented using a markup language such as HTML and related technologies displayed inside a web-browser technology such as Safari®, Firefox®, or Internet Explorer®. In yet another embodiment, the AR networking application may be a stand-alone application designed to be downloaded and run on a specific device such as a tablet running the Apple iOS operating system, Android operating system, or others. The stand-alone applications may be created using a set of application programming interfaces (APIs) and libraries.

In one embodiment, a user (e.g., any/all of the students 104a-c) upon accessing the Website and/or the AR networking application associated with the server system 110 may be presented with one or more UIs displayed (not shown) on a display screen of the computing device to send a profile creation request to the server system 110 so as to utilize various features of the application upon registration/creation of the profile. The user may be prompted to provide personal information using the UI, such as his or her name, age (e.g., birth date), gender, interests, contact information, hometown, address, educational information, occupation, favourite activities, skills, professional organizations, relationship status and the like. The user may also link their social media networking accounts or learning accounts to the AR networking application while registering. Social network information associated with the user may be fetched by the server system 110 from the linked accounts. This information is stored, for example, as profile data in a database associated with the server system 110 with a reference number to identify the user. This information may be later altered, modified, added, or deleted by the user or by an administrator. A registered user is hereinafter alternatively referred to as a user having his/her profile created in the server system 110.

In at least one example embodiment, upon registration, an interactive learning profile test may be provisioned on the UI (not shown) of the computing device of the user by the server system 110. The user may be requested to take a fresh interactive learning profile test or upload a previous test taken earlier on the application. In one example embodiment, the one or more responses inputted by the user on the UI for the test may correspond to a learning profile of the user. The learning profile may be utilized by the server system 110 to determine context based information that can be provisioned in an augmented reality through the UI of the computing device. For example, the learning profile test can be as simple as asking whether the user (such as the student 104a) prefers math problems written in equations or in sentences. It can also ask the user (such as the student 104b) to solve a specific problem and measures the time the user actually spent to solve the problem or records the approach the user took to solve the problem. For other subjects such as history, it can also ask whether the user (such as the student 104c) prefers historical events in a visual format such as animation/movie or in a readable format. In other example scenarios such as of social interactions, a learning profile test can be a short quiz to see how well the user can associate faces with names Depending on how well the user can match a person with a face, the server system 110 may be configured to adjust what kind of information to bring up/provision when the user runs into someone.

In at least one example embodiment, along with the profile data and learning profile of the user, the AR networking application installed on the computing device of the user may be configured to utilize a plurality of sensing modules associated with the application to collect real time information of the user to determine the context based information. Some non-exhaustive examples of the sensing modules include an accelerometer, a gyroscope, a magnetometer, a camera, a microphone, a Global Positioning System (GPS) receiver, a light sensor, an altitude sensor, a proximity sensor, a compass, a blood pressure monitor, a heart rate monitor, a body temperature sensor, a papillary response detector, a haemoglobin saturation monitor, a skin conductivity monitor, a respiration rate monitor, a brainwave activity inspector and the like. The collection of information is sent to the server system 110 over the network 120.

In the illustrated example of the classroom facility 102, the teacher 108 is exemplarily providing educational lecture on a subject of Geography. The collection of information captured by the application installed on the computing device 106a of the user 104a is sent to the server system 110 for further analysis and processing. For example, the server system 110 may be configured to analyse the learning profile of the user 104a and determine that geography is one of his weaker subjects and he is more of a visual learner. The server system 110 may further analyse information received from the brain wave activity inspector (sensor) and determine that he has trouble paying attention in the class. Based on such analysis, the server system 110 may be configured to determine suitable form of context based information for the user 104a. A notification (i.e., the context based information) presented through a UI on a display screen of the computing device 106a of the user 104a may be in the form of a video of the lecture covered more in depth. The video can be captured by the camera of the computing device 106a and can be played back based on user request.

In one example embodiment, if the user 104b is found to be liking more of a game-like setting based on analysing the collection of information associated with her by the server system 110, then the lecture may be provisioned through the UI on the display screen of the computing device 106b in a series of questions where every correct response gives the user 104b additional points for a right answer. Further, the questions may be answered with responses captured by an audiovisual capture module (as explained with reference to FIG. 2) or through the UI. Further, if the server system 110 identifies some answers to be incorrect, the server system 110 may be configured to provision additional explanation on the answers that were incorrect.

In another example embodiment, the collection of information associated with the user 104c may be detected by the plurality of sensors and analysed by the server system 110. The server system 110 determines that the user 104c has been losing his attention and was asleep for a certain period of time. Based on such analysis, the server system 110 may be configured to generate a notification through the UI on the display screen of the computing device 106c with more user-specific engaging subject illustrations or sounds or types of colours that would keep the user 106c awake and pay more attention to the lecture. The various features of the AR networking application capable of facilitating context based information to the end users are explained hereinafter with reference to FIGS. 2-7.

Figure 2:
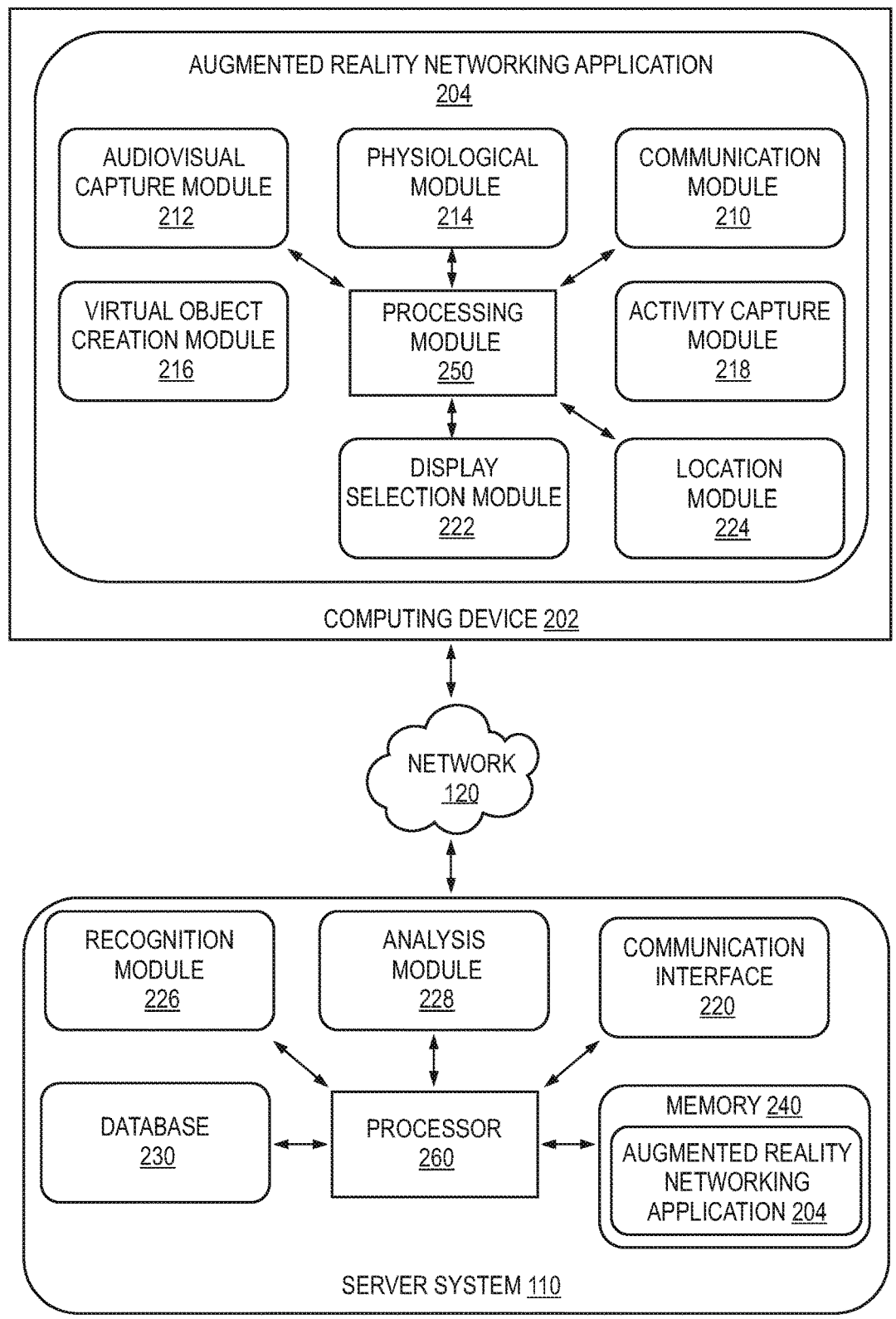
FIG. 2 illustrates a system block diagram representation of a computing device and a server system for facilitating context based information, in accordance with an example embodiment of the present disclosure.

FIG. 2 illustrates a system block diagram representation 200 of a computing device and the server system 110 for facilitating context based information, in accordance with an example embodiment of the present disclosure. The server system 110 is shown in communication with the computing device 202 over a communication network such as the network 120 of FIG. 1. In an embodiment, the various operations performed by the server system 110 may be implemented using the AR networking application 204 installed in the computing device 202. The computing device 202 may correspond to a device corresponding to an end-user being any one of a registered user willing to receive context based information for social interactions or learning purposes. For example, the computing device 202 is example of any of the computing devices 106*a-c,* the computing device 350 (as explained hereinafter with reference to FIG. 3) or the computing device 450 (as explained hereinafter with reference to FIG. 4). The computing device 202 is depicted to include one or more applications, including the AR networking application 204 for context based information, which serves as an instance of the application downloaded from the server system 110 and capable of communicating through web requests with the server system 110 to facilitate context based information.

It should be understood that the computing device 202 as illustrated and hereinafter described is merely illustrative of one type of device and should not be taken to limit the scope of the embodiments. As such, it should be appreciated that at least some of the components described below in connection with that the computing device 202 may be optional and thus in an example embodiment may include more, less or different components than those described in connection with the example embodiment of the FIG. 2. As such, among other examples, the computing device 202 could be any of a mobile electronic devices, for example, cellular phones, tablet computers, laptops, mobile computers, desktop computers, personal digital assistants (PDAs), mobile televisions, mobile digital assistants, smartwatches or any combination of the aforementioned, and other types of communication or multimedia devices. The illustrated computing device 202 includes a processing module 250, a communication module 210, an audiovisual capture module 212, a physiological module 214, a virtual object creation module 216, an activity capture module 218, a display selection module 222 and a location module 224.

In one embodiment, the processing module 250 (e.g., a signal processor, microprocessor, ASIC, or other control and processing logic circuitry) performs such tasks as signal coding, data processing, image processing, input/output processing, power control, and/or other functions. In addition to the AR networking application 204, the applications may include common mobile computing applications (e.g., telephony applications, email applications, calendars, contact managers, web browsers, messaging applications) or any other computing application. The AR networking application 204, in at least one example embodiment, may be configured to provide the logic to facilitate context based information, as explained with reference to FIG. 1 and will be explained with reference to FIGS. 3 to 7.

In one embodiment, the communication module 210 may include mechanisms configured to receive inputs from and provide outputs to a user (such as any of the users 104*a-c*) through the computing device 202 associated with the user. The communication module 210 may include at least one input interface and/or at least one output interface. Examples of the input interface may include, but are not limited to, a keyboard, a mouse, a joystick, a keypad, a touch screen, soft keys, a microphone, a gesture recognition device, and the like. Examples of the output interface may include, but are not limited to, a User Interface (UI) such as a UI display (such as a light emitting diode display, a thin-film transistor (TFT) display, a liquid crystal display, an active-matrix organic light-emitting diode (AMOLED) display, etc.), a microphone, a speaker, a ringer, a vibrator, and the like. In an embodiment, the user may utilize the computing device 202 to access the UI provisioned by the communication module 210 and interact with the server system 110. The UI is further configured to display the context based information determined by the server system 110 in an augmented reality view. It is understood that the output interface of the computing device 202 may facilitate an augmented reality or heads-up display where a projected image or graphic is superimposed over a real-world view as perceived by the user through the output interface.

In one embodiment, the audiovisual capture module 212 may be configured to listen to audio, record video, capture images or other interactions that are within field of view of the computing device 202 to identify people, objects and other relevant contents. For example, the audiovisual capture module 212 may determine whether additional users are present in the field of view of a pair of electronic glasses that the user is wearing or a direction the user is pointing the electronic glasses towards by capturing imaging or recording videos. The image or video may be captured by a camera located on the computing device 202 based on receiving instructional commands from the audiovisual capture module 212. In some embodiments, the camera may be digital and can take pictures and record video. The audio may be captured by a microphone or other audio input device. In other embodiments, the camera may be used to generate an augmented reality where computer generated images appear to interact with the real-world view perceived by the user. The communication module 210 may send audiovisual information from the audiovisual capture module 212 to the server system 110 to determine an identity of the user. In some embodiments, a user's facial and body movements may be captured by another user's audiovisual capture module may be sent to the server system 110 to detect speech/language impairment.

In one embodiment, the physiological module 214 may detect physiological and biometric responses associated with the user. The physiological module 214 may include one or more biometric detection devices/sensors such as a blood pressure monitor, a heart rate monitor, a body temperature sensor, a papillary response detector, a hemoglobin saturation monitor, a skin conductivity monitor, a respiration rate monitor, a brainwave activity inspector, or any other device capable of providing biometric data. The communication module 210may send physiological information acquired from the physiological module 214 to the server system 110 to determine the emotional state, biostatistics, well-being, and mood of the user.

In one embodiment, the virtual object creation module 216 may be configured to facilitate the user to interact with the augmented reality view by inserting annotations, comments, virtual objects, pictures, audio, and video, to locations within range of the computing device 202. The virtual objects may include virtual characters or static virtual objects, and any other virtual objects that can be rendered by the AR networking application 204. The creation and facilitation of an interactive virtual object in the augmented reality view is explained in detail with reference to FIG. 3 later.

In one embodiment, the activity capture module 218 may be configured to recognize a user's current activity such as whether the user is currently in a vehicle, on a bicycle, on foot, swimming, drinking coffee, doing homework, or sitting down by utilizing one or more motion sensors.

In one embodiment, the display selection module 222 may be configured to select a subset of the information received from the server system 110 or the location module 224 for presentation to the user. The selection may be computed based on limitations of the computing device being used by the user (i.e., the computing device 202) such as screen size, resolution, portability, functionality, type of the content, user preferences and the like. For example, the context based information is presented in a form that is more suitable for a mobile device having small screen space or for smartglasses which have yet smaller screen size.

In one embodiment, the location module 224 may be configured to determine the location of the user. The location may be determined directly by a variety of sensing components such as infrared proximity sensors, optical cameras and infrared (IR) cameras, GPS, compass, and the like. The location module 224 may determine the user's location while the user is moving from one physical location to the next physical location. In some embodiments, one or more sensors or cameras may be used to track the three dimensional (x, y, z) coordinates of the user. In some embodiments, the location information may indirectly be received from another computing device via wireless networking, hotspots, Bluetooth, or other means. The cameras may also determine the location based on how far the body and face of a user is when viewed. The distance of the computing device 202 from the user's eyes may also be determined to calculate and adjust location information accordingly.

In one embodiment, the communication between the computing device 202 and the server system 110 is initiated using the communication module 210 and a communication interface 220 present on the server system 110. The network 120 is configured to transfer the user information collected by the computing device 202 using the AR networking application 204 to the server system 110. The processing module 250, in conjunction with, the communication module 210 may be configured to send notifications to the plurality of sensing modules associated with the AR networking application 204 and the server system 110. The processing module 250, in conjunction with, the communication module 210 may be configured to receive notifications from the sensing modules and the server system 110. For example, the communication module 210 may communicate information about the user's location or current activity to the server system 110 from the location module 224 and activity capture module 218 respectively. The server system 110 (as explained in detail hereinafter) may provide (context based) information concerning other users who are nearby to the user or have similar interests to the user based on location information and activity information of the user. In various embodiments, the server system 110 may provide context based information concerning other users based on profile data of the other users maintained with respect to the AR networking application 204, data acquired of the other users from previous interactions with the user on the application 204, activity of the other users on the application 204, data acquired from the social media networking websites and the like.

In an example embodiment, the server system 110 includes at least one processor 260, a memory 240, a database 230, a communication interface 220, a recognition module 226 and an analysis module 228 for facilitating context based information. The processor 260 is operatively coupled with the memory 240, the database 230, the communication interface 220, the recognition module 226 and the analysis module 228. In at least one embodiment, the server system 110 may be accessible to user electronic devices, such as the computing device 202, through a communication network, such as the network 120. The server system 110 may operate on a single server or may be distributed across multiple servers that may be in the same location or different locations.

The database 230 is any computer-operated hardware suitable for storing and/or retrieving data, such as, but not limited to, the profile data of a plurality of users, users' set preferences, learning profiles, past activities, data captured by the plurality of sensing modules, communication between the plurality of users, a plurality of created and provisioned virtual objects, social network information fetched from the linked social media networking accounts of the plurality of users (e.g., Instagram®, Facebook®, LinkedIn®, Snapchat®, Twitter® etc.), information fetched from internal networks provided by institutions of the users having internal social networking websites, information concerning various online/offline groups and memberships of the users and the like.

The database 230 may include multiple storage units such as hard disks and/or solid-state disks in a redundant array of inexpensive disks (RAID) configuration. The database 230 may include a storage area network (SAN) and/or a network attached storage (NAS) system. In some alternate embodiments, the database 230 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The server system 110 include one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 260 with access to the database 230.

The processor 260 is capable of executing the stored machine executable instructions of the AR networking application 204 in the memory 240 or within the processor 260 or any storage location accessible to the processor 260. The processor 260, in conjunction with, the analysis module 228 is configured to perform the various operations as is explained later with reference to methods 500, 600 and 700. For example, the processor 260 may be configured to receive requests from various sensing modules of the computing devices 202, process or analyze the requests using the analysis module 228 and the recognition module 226, and then transmit responses for the requests to the computing device 206, another computing device, or an external source. In some embodiments, the received requests may include various types of information, such as recorded audio or video, identification of a user, biometric data of the user, learning patterns and development of the user, location information to identify a user's current location, the user's activity, and such other types of information that may be analyzed by the analysis module 228 to determine the context based information. The processor 260 is further configured to facilitate creation of an interactive virtual object to be displayed in the augmented reality view through the UI of the computing device 202. The processor 260 is configured to facilitate a search engine on the UI using which the user can input a search query and a notification reply corresponding to the search query may be facilitated by the processor 260 on the UI. The processor 260 further includes machine learning algorithms to associate the user's learning profile with those of other users. By collecting this data, it can associate the user with other users with similar learning profiles, and popular techniques or methods that have helped those other users can also be applied to this specific user.

In an embodiment, the processor 260 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 240 may be configured to store the machine executable instructions of the AR networking application 204 for the processor 260 to execute for facilitating context based information. The memory 240 is a storage device embodied as one or more volatile memory devices, one or more non-volatile memory devices, and/or a combination of one or more volatile memory devices and non-volatile memory devices, for storing micro-contents information and instructions. The memory 240 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The communication interface 220 is configured to facilitate communication between the server system 110 and computing device 202 associated with end-user. The communication interface 220 is configured to cause display of UIs on the computing device 202, thereby enabling the end-users to communicate with one another. The communication interface 220 collaborates with the communication module 210 of the computing device 202 for sending the context based information to be displayed in the augmented reality view through the UI of the computing device 202. In one embodiment, the communication interface 220 includes a transceiver for wirelessly communicating information to, or receiving information from, the computing device 202 or other suitable display device, and/or another type of remote processing device. In another embodiment, the communication interface 220 is capable of facilitating operative communication with the remote devices and a cloud server using API (Application Program Interface) calls. The communication may be achieved over a communication network, such as the network 120.

In at least some example embodiment, the server system 110 may include an I/O module (not shown in FIG. 2) configured to receive inputs from and provide outputs to the users of the server system 110. To that effect, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a microphone, a speaker, a ringer, a vibrator, and the like.

In one embodiment, the recognition module 226 may be configured receive captured audiovisual information from the audiovisual capture module 212 of the computing device 202 to determine which of the objects in audiovisual information are human beings. In some embodiments, the recognition module 226 may identify a user using one or more facial recognition algorithms or one or more voice recognition algorithms. In other embodiments, the user may be identified by comparing the user in the image to a stored digital image located in the database 230. In other example embodiments, the image may be posted on the institution wide internal social networking sites to identify the user. In some embodiments, the user may be identified by the user viewing another user's computing device and scanning for a unique code on the computing device using components such as cameras or scanners.

In one embodiment, the analysis module 228 may be configured to analyze the requests received from the plurality of sensing modules of the computing device 202 and determine appropriate responses. For example, the analysis module 228 may determine to generate a notification that includes context based information about other nearby users that have similar interests and also match the criteria selected by the user. The criteria may include information entered by the user into the AR networking application 204, former activity of the user, social network information, similarities between the user and the other users, declared or acknowledged relationships between the user and other users and the like.

In one example embodiment, the analysis module 228 may include Machine Learning algorithms, communication patterns, statistical breakdown, semantic examination, and/or natural language processing algorithms to determine the context based information. For example, the characteristics of the association between the users may be analyzed. The characteristics of the association may include the duration of the association, the condition and welfare of the association, the importance of the association, and how often the users in the association have communicated. In various embodiments, the analysis module 228 may be configured to generate instructions for presenting information about selected users on a computing device of a user in a condensed visual form based on the type of computing device being used by the user.

Figure 3:
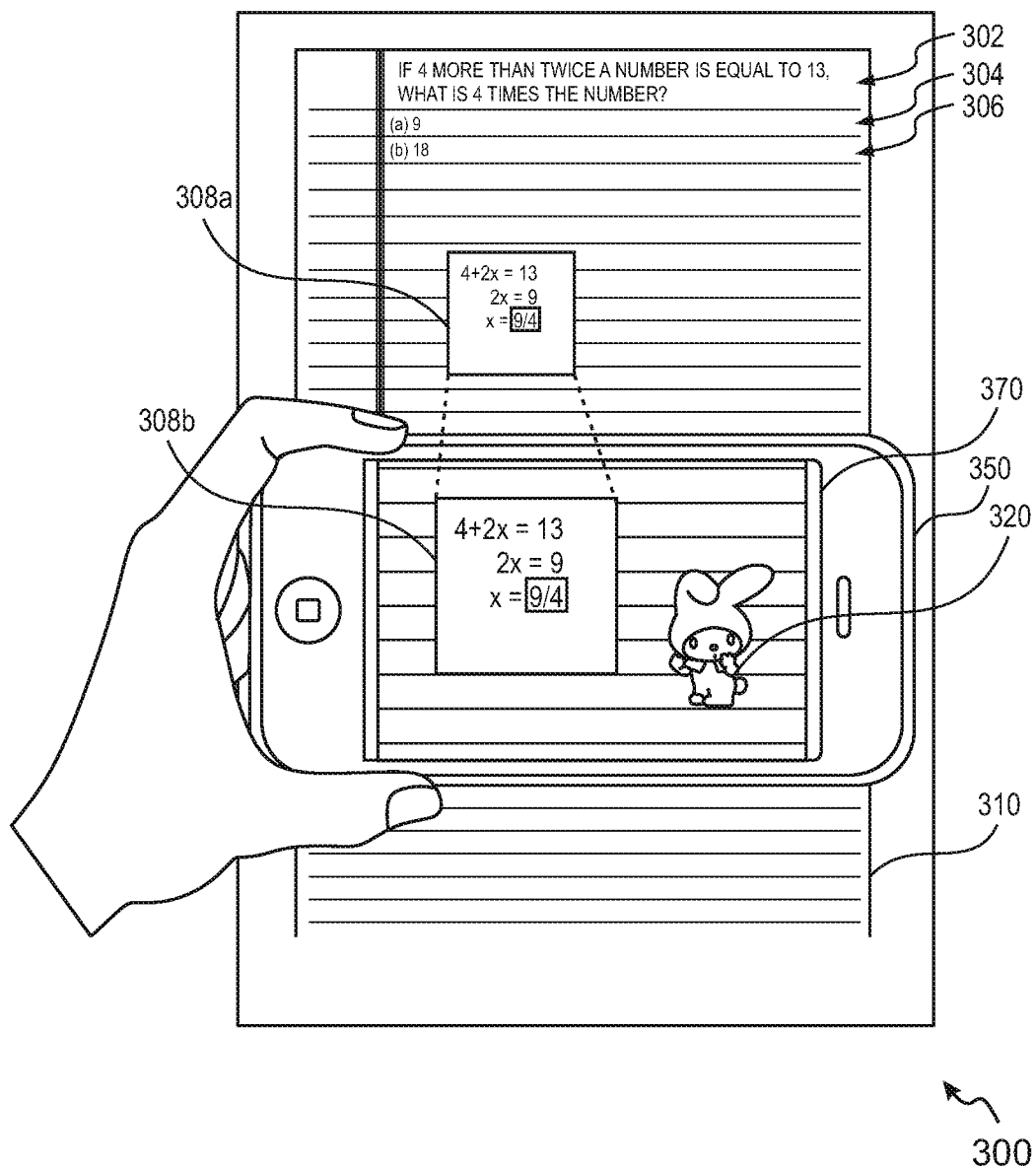
FIG. 3 shows a simplified representation of an interactive virtual object displayed in an augmented reality view through a User Interface (UI) of a computing device, in accordance with an example embodiment of the present disclosure.

FIG. 3 shows a simplified representation 300 of an interactive virtual object displayed in an augmented reality view through a UI of a computing device, in accordance with an example embodiment of the present disclosure. In an illustrative example, a multiple choice question (MCQ) 302 of Mathematics on a notepad 310 of a user (not shown) is shown. The MCQ 302 is exemplarily depicted to be 'If 4 more than twice a number is equal to 13, what is 4 times the number?' One or more answer choices such as '(a) 9' (see, 304) and '(b) 18' (see, 306) are shown on the notepad 310 from which the user can select a correct answer such as by marking a square around the correct answer. The notepad 310 also includes a box 308a depicting a calculation performed by the user. It is apparent from the calculation that the answer calculated by the user is incorrect as the correct answer for the MCQ 302 would be '(b) 18' (see, 306).

The representation 300 also includes a UI 370 of a computing device 350 (i.e., a mobile phone held by the user) with the AR networking application 204 installed on the computing device 350. In an example embodiment, the application 204 may be configured to capture a calculation performed (see, box 308a) by the user through the audiovisual capture module 212 associated with the computing device 350 and send the calculation with the captured answer to the server system 110 for further analysis to provide context based information to the user. In another example embodiment, as the user performs calculation, the server system 110 may be configured to analyse the calculation in real time and the context based information can be provided in real time.

In one embodiment, the server system 110 is configured to facilitate creation and/or provision of an interactive virtual object 320 (hereinafter referred to as a virtual object 320 or a rabbit 320) in an augmented reality view through the UI 370 of the computing device 350 on the surface of the notepad 310. The rabbit 320 is shown to the user through the UI 370 as if it is standing right on top of the notepad 310. The computing device 350 is configured to display what it sees on the notepad 310 as shown by a corresponding box 308b with the corresponding rabbit 320 on the UI 370 (i.e., a display screen of the computing device 350). The box 308a of the calculation is currently in a field of view of the computing device's display and therefore the rabbit 320 is shown next to the box 308a. In another example scenario, if the MCQ 302 is in a field of view of the computing device's display, the rabbit 320 can be configured to move to the MCQ 302 and may point to the correct answer '(b) 18' (see, 306) as a hint for the user to recalculate. Alternatively, the rabbit 320 can also walk over to the portion of the MCQ 302 where the user is solving incorrectly or the portion of the calculation steps the user is using incorrectly in order to stimulate the user to think about it instead of simply showing the correct answer. In an example embodiment, the rabbit 320 may be configured to stay positioned in the user's augmented view or can appear to relocate away from the augmented view and return to the augmented view.

In the illustrative example, the rabbit 320 may be configured to ask the user to make sure whether his answer is final, since the server system 110 determines that the user is missing a step. In some embodiments, the user may be enabled to send one or more audio commands to the rabbit 320 that can be captured from the audiovisual capture module 212 available on the user's computing device 350 and sent to the server system 110, which may configure the rabbit 320 to respond and act according to the commands of the user. This way, the learning is made more meaningful rather than just displaying an answer or static steps to solve the problem.

In other example embodiments, the virtual object 320 may alert a visually or audibly impaired user of any dangerous or peculiar objects in real time that are captured by the audiovisual capture module 212. In various example embodiments, the virtual object 320 may be configured to change appearance based on information gathered from the sensing modules of the computing device 350. For instance, biometric data sent by the physiological module 214 may be analyzed by the analysis module 228 to determine that the user is in an angry state of mind. Accordingly, a notification may be sent for the virtual object 320 to change into a dragon from the rabbit in the augmented reality view through the UI 370 of the computing device 350. In another example, if it is determined that the user is concentrating on doing work, the virtual object 320 (i.e. virtual pet) may become idler not to break the user's concentration.

In various embodiments, the virtual object 320 may be virtual artifact, virtual pet, virtual equipment, or other types of virtual objects that may be rendered by the computing device 350. In some embodiments, the analysis module 228 may extract an object from an image or a video captured by using a variety of sensing modules such as optical cameras or infrared (IR) cameras to create a virtual object based on the user request. In one example embodiment, the virtual object 320 may be selected, cropped, or inputted by the user from the computing device 350. In other embodiments, the virtual object 320 may be gathered from the server system 110, third party websites or social media networking websites. The analysis module 228 may be configured to manage, add, remove, transfer, alter, modify, command, or interact with the virtual object 320 based on receiving input from the user's computing device 350.

In an example embodiment, the server system 110 may be configured to render an environment including content scenes and story lines to adapt to actions or presence of the rendered virtual objects (such as the virtual object 320). Further, the virtual objects may also be modified in response to a change in the environment. In various example embodiments, rendered virtual objects pertaining to one user may interact with rendered virtual objects pertaining to other users. For example, the server system 110 may be configured to create a virtual pet dog X (hereinafter alternatively referred to as a pet dog X) for user A from the stored data in the database 230. The audiovisual capture module 212 may send information to the analysis module 228 about the surrounding environment. The analysis module 228 uses the audiovisual information to generate a notification where the pet dog X may interact with the surrounding environment viewed by the user A in an augmented reality view of his computing device. Moreover, the analysis module 228 may generate a notification to present user B's virtual pet dog Y in view of the user A's computing device if the pet dog Y is in direction of the user A's augmented reality view of the computing device. The server system 110 may use information from the location module 224 and the audiovisual capture module 212 of the presence of the user B to present the pet dog Y to the user A. Further, the user A may be enabled to interact with the pet dog Y such as by feeding it.

Figure 4:
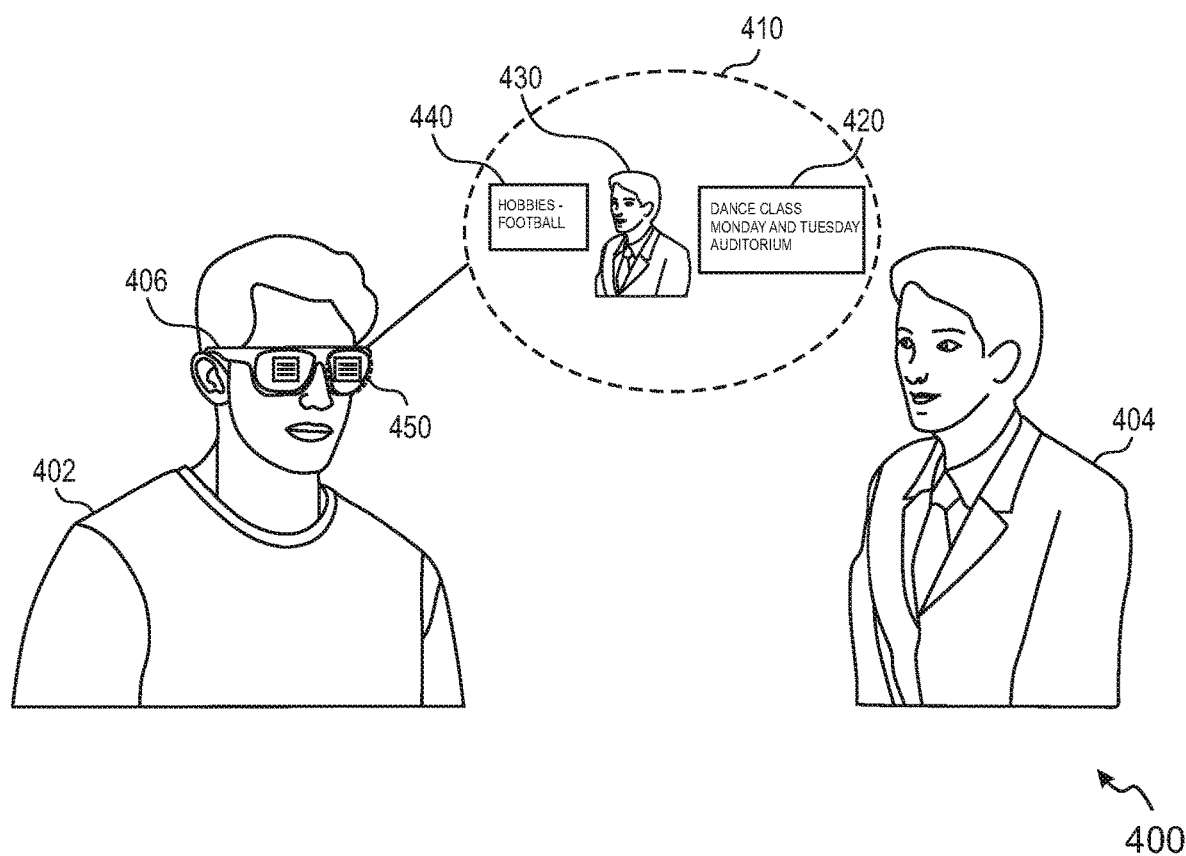
FIG. 4 shows a simplified representation of a context based information displayed in an augmented reality view through the UI of the computing device, in accordance with an example embodiment of the present disclosure.

FIG. 4 shows a simplified representation 400 of a context based information displayed in an augmented reality view through a UI of a computing device, in accordance with an example embodiment of the present disclosure. As shown, a first user 402 having worn smartglasses 406 (i.e., the computing device 406) with the AR networking application 204 installed on the smartglasses 406 and comes across a second user 404 who is unknown to him The location module 224 associated with the application 204 is configured to capture and send the location information of the first user 402 to the server system 110. Using the location information and the near-field communication (wireless, or Bluetooth signal of the location of the second user 404 falling within a range of delectability of the smartglasses 406), the server system 110 may be configured to determine that the first user 402 is in the same geographical location as the second user 404. Further, the audiovisual capture module 212 may be configured to capture an image or record an audio of the second user 404 from the smartglasses 406 and send the data to the server system 110 for facial/voice recognition using the recognition module 226. Upon identifying the second user 404, the server system 110 may be configured to retrieve information associated with the second user from the database 230 if it is a registered user or public information available online on the social media networking websites being used by the second user 404.

Based on such analysis, the server system 110 determines that the first user 402 and the second user 404 go to a same dance class at a university on every Monday and Tuesday, in an auditorium of the university. In the illustrative representation 400, such context based information as determined by the server system 110 related to the second user 404 may be displayed in an augmented reality view 410 proximate to the second user 404. It is understood that the augmented reality view 410 can be seen by the first user 402 using a UI 450 (such as a display screen) of the smartglasses 406. The context based information may be presented in the augmented reality view 406 through the UI 450 in such a way that a particular object type may be blended into the real scene naturally so as to achieve the highly realistic effect. The context based information of the second user 404 is exemplarily displayed using one or more boxes such as a box 420 and a box 440. The box 420 includes information such as 'Dance class', 'Monday and Tuesday' and 'Auditorium'. The box 440 includes additional information such as 'Hobbies—Football'. The augmented reality view 410 further includes a profile picture 430 of the second user 404 retrieved from the social medial networking website associated with the second user 404. Such real time provision of context based information may help the first user 402 recognize the second user 404 immediately and help him initiate a relevant conversation/social interaction with the second user 404.

In one embodiment, the context based information may be abbreviated or condensed by the display selection module 222 based on the limitations of the computing device or the amount of information. Alternatively, the first user 402 may alter settings through the UI 450 to select which type of context based information he wishes to receive. In some embodiments, the context based information may be the second user's age, birthday, profession, relationship status, work place, interests, past experiences, activities, common friends and associates, or other types of information.

In one example embodiment, the first user 402, upon recognizing the second user 404, may be enabled to invite the second user 404 to connect via the AR networking application 204 using the UI 450. In some embodiments, the connection may be one sided where the first user 402 follows the second user 404, which does not require the second user's consent. In other embodiments, upon being connected with each other using the application 204, both the users 402, 404 may be enabled to communicate with each other by sending messages, pictures, videos, and other context based information in the personalized content feed on their associated computing devices. For example, the server system 110 may include a photo and video sharing service that allows both the users 402, 404 to upload photos or videos to the server system 110 or other social media networking websites, share photos or videos with each other/a plurality of other registered users. The photos or videos can also be placed at a location that other users can view when looking in the direction of the location in an augmented reality view from their respective computing devices. In some embodiments, the server system 110 may include messaging services such as an email application, an instant messaging application, or a variation of the two using which both the users 402-404 may interact with each other.

In one example embodiment, the server system 110 may be configured to select a subclass of a plurality of users of the AR networking application 204 based on criteria such as locations, comparison of information stored in the database 230, relationship status, friends with a specific user, affiliation with an organization/school and the like. Forming of subclasses may be requested by a user or automatically computed by the server system 110. For example, users can organize themselves into groups around a subject matter or a topic of interest or subscribe to groups affiliated with one or more institutes so as to receive updates regarding news, events, emergencies, and other activities associated with the one or more institutes.

Figure 5:
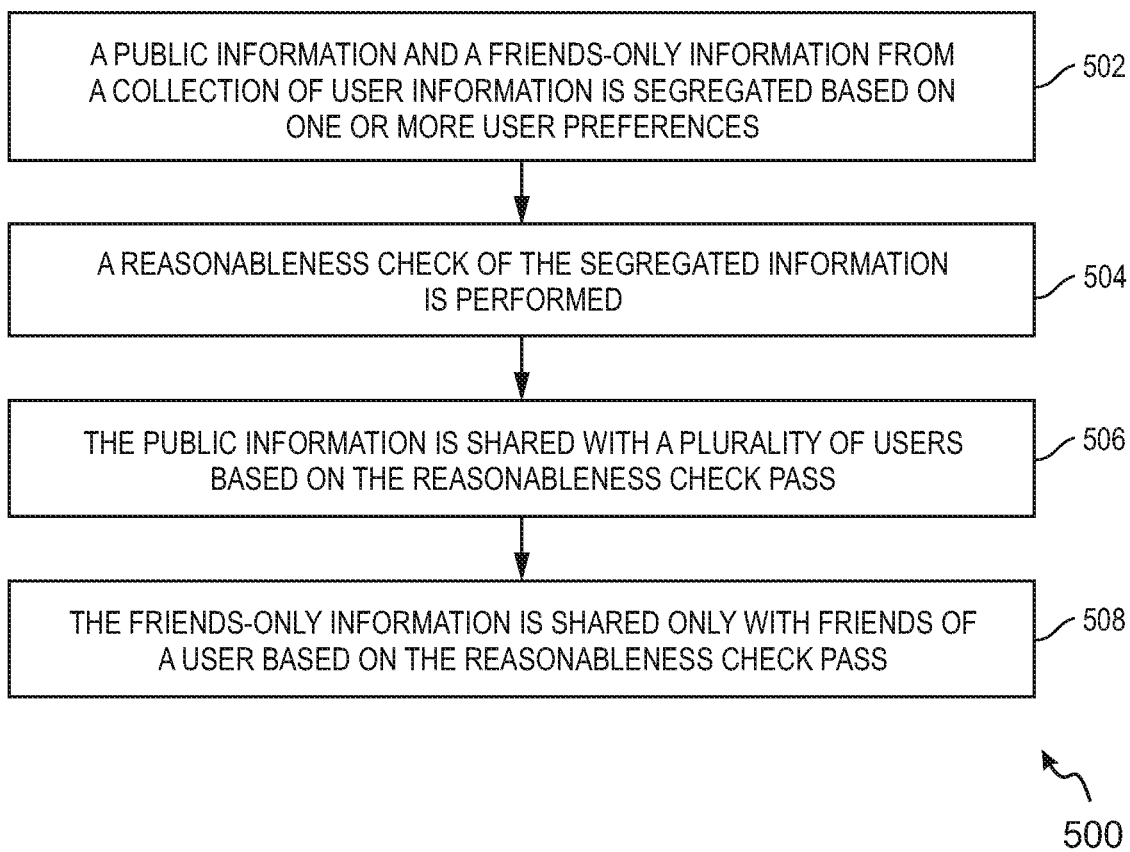
FIG. 5 is a flow diagram of a method for sharing public information of a user with a plurality of users in augmented reality views, in accordance with an example embodiment of the present disclosure.

FIG. 5 is a flow diagram of a method 500 for sharing public information of a user with a plurality of users in augmented reality views, in accordance with an example embodiment of the present disclosure. The various steps and/or operations of the flow diagram, and combinations of steps/operations in the flow diagram, may be implemented by, for example, hardware, firmware, a processor, circuitry and/or by the server system 110 of FIG. 1 and by a combination of a computing device associated with a user and the server system 110 and/or by a different electronic device associated with the execution of software that includes one or more computer program instructions.

At 502, a public information and a friends-only information from a collection of user information is segregated based on one or more user preferences. In one embodiment, when a user is creating a profile on a server system (such as the server system 110 of FIG. 1) by inputting identification information along with linking social media networking accounts using a computing device, the server system may facilitate the user to provide one or more user preferences for marking the user information as public or friends-only. In various embodiments, the segregation of the user information may be based on location preferences provided by the user. Further, the segregation of the information may be based on a set of friends chosen by the user to whom a certain information at a certain pre-defined time can be shared by the server system.

At 504, a reasonableness check of the segregated information is performed. The reasonableness check may be performed to verify certain information regarding the user. For example, if the user declares herself as an employee of a company, the user's information must be verified against the company information to make sure the user is indeed employed by the company. Similarly, educational information of a university student or a student at a learning center may be verified from the respective university or the learning center.

At 506, the public information is shared with a plurality of users based on the reasonableness check pass. The public information may be shared with the plurality of users based on user's location. Further, a part of the public information may be restricted to be shared at a certain time period, for example, when the user is at work. The user can link her Instagram® account to the AR networking application 204 such that the pictures uploaded on Instagram® can be shared publically with the plurality of users in real life interactions in the form of context based information as and when applicable.

At 508, the friends-only information is shared only with friends of a user based on the reasonableness check pass. The server system can dynamically adjust what information can be shared based on how many friends are nearby, which friends are nearby, which family members are nearby and the like. For example, the users A and B are having a conversation and something in the conversation triggered user B to remember the vacation trip she took last summer The server system detects that user B is going to bring up the summer trip, and it searches user B's social network for any pictures or videos she took. Concurrently, the server system also searches user A's social network to see whether user A has ever taken a similar trip. The server system finds out that user A was supposed to take a vacation trip last summer but could not, due to the fact that she got laid off from her work. Based on this information, the server system suggests user B not to bring up the topic of her vacation. Instead, it suggests other topics to user B such as how user A was able to cope with the layoff. It is understood that this scenario is possible when users A and B have shared their social network information with each other through the server system.

Figure 6:
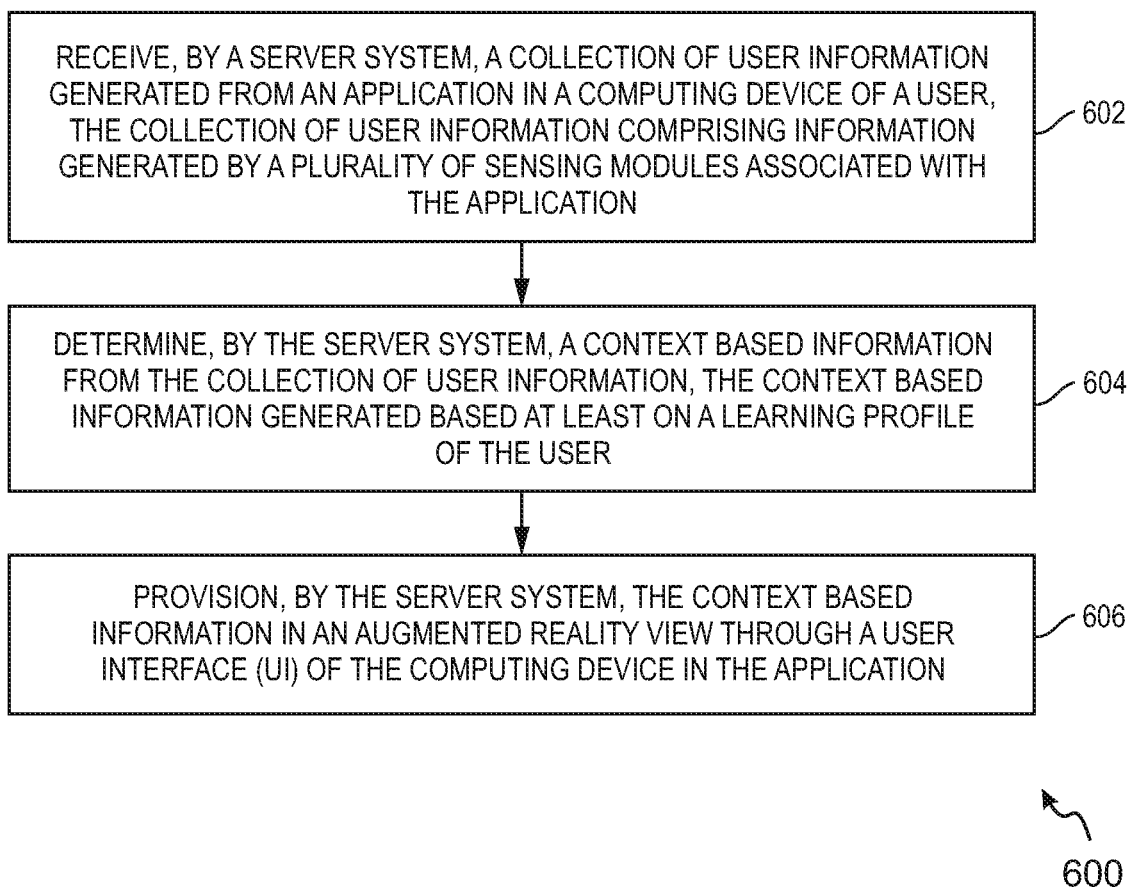
FIG. 6 is a flow diagram of a method for facilitating context based information, in accordance with an example embodiment of the present disclosure.

FIG. 6 is a flow diagram of a method 600 for facilitating context based information, in accordance with an example embodiment of the present disclosure. The various steps and/or operations of the flow diagram, and combinations of steps/operations in the flow diagram, may be implemented by, for example, hardware, firmware, a processor, circuitry and/or by the server system 110 of FIG. 1 and/or by a different electronic device associated with the execution of software that includes one or more computer program instructions.

At 602, a collection of user information generated from an application in a computing device of a user is received by a server system. The collection of user information includes information generated by a plurality of sensing modules associated with the application. The collection of user information further includes activities and behaviors of the user with respect to the application (such as the AR networking application 204). For example, sharing events with other users, updates to the user's profile, the user's current status, the user's current mood or emotional state, the user's current progress on an assignment or a curriculum, the user's created virtual objects, interactions with virtual objects, the user's current learning development, or any other information determined about the user.

At 604, a context based information is determined by the server system from the collection of user information. The context based information is generated based at least on a learning profile of the user. As explained with reference to FIG. 1, upon registration, the user is requested to take an interactive learning profile test from the server system (such as the server system 110) using the computing device. The server system is configured to determine the context based information based on determining various user characteristics from the one or more responses received for the test and the collection of user information.

At 606, the context based information is provisioned by the server system in an augmented reality view through a UI of the computing device in the application. In some embodiments, a user may be enabled by the server system to share the context based information such as the activities performed by the user during a certain time period as detected by the activity capture module 212 with another user using the computing device. In other embodiments, the server system may be able to track a habit of a user and provide context based information accordingly. For example, a user has a habit of going to a candy vending machine around 2PM every day. The server system tracks this habit and identifies the trigger points by analyzing the user's actions prior to 2PM every day. If the server system finds that the user usually sits at her desk for at least one hour before she gets up to go to the vending machine, the server system may suggest the user to be more active after lunch as one way of breaking the habit of going to the vending machine.

Figure 7:
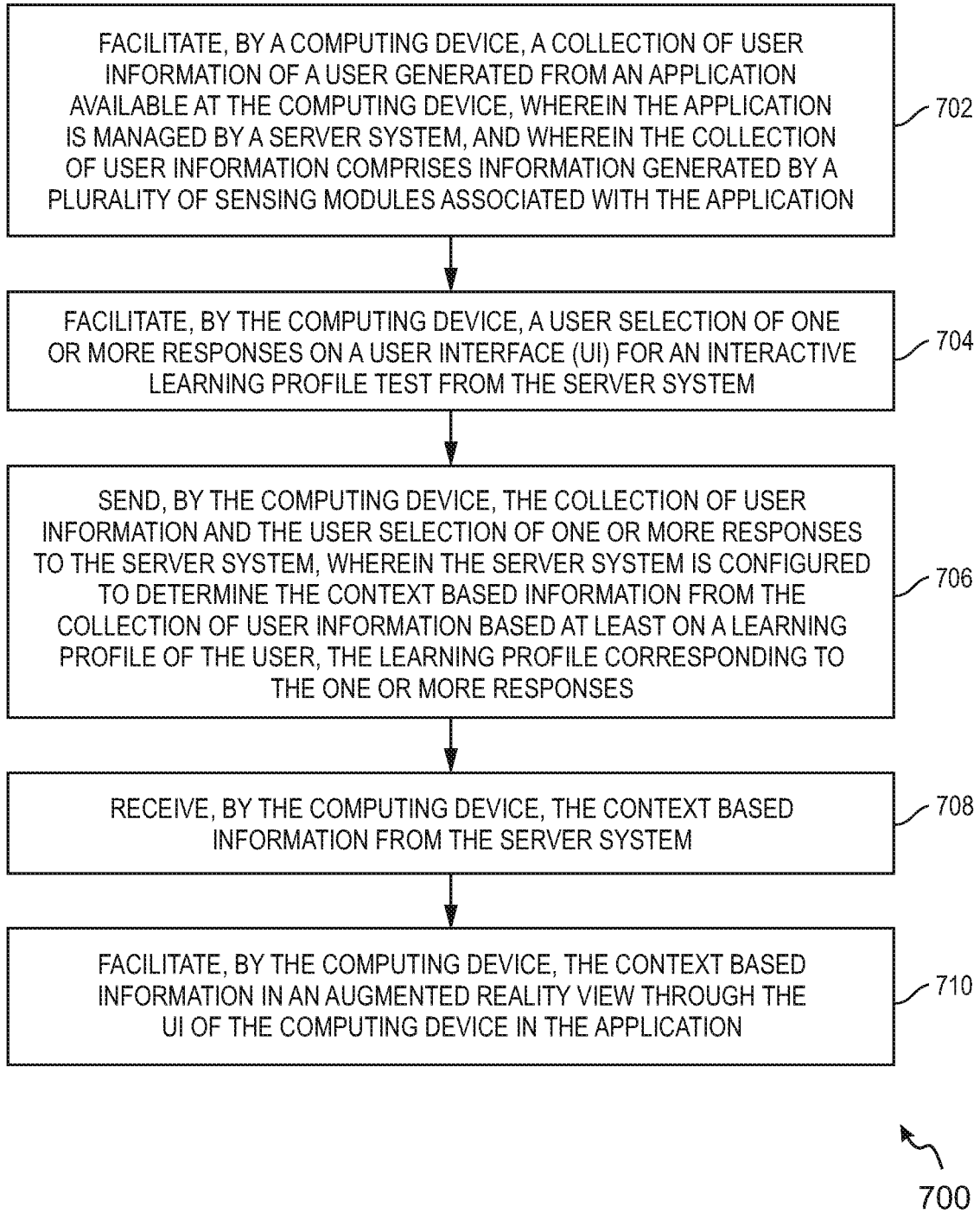
FIG. 7 is another flow diagram of a method for facilitating context based information, in accordance with an example embodiment of the present disclosure.

FIG. 7 is another flow diagram of a method 700 for facilitating context based information, in accordance with an example embodiment of the present disclosure. The various steps and/or operations of the flow diagram, and combinations of steps/operations in the flow diagram, may be implemented by, for example, hardware, firmware, a processor, circuitry and/or by the computing device of a user or by the server system 110 of FIG. 1 or by a combination thereof and/or by a different electronic device associated with the execution of software that includes one or more computer program instructions.

At 702, a collection of user information of a user generated from an application available at a computing device is facilitated by the computing device. The application is managed by a server system and the collection of user information includes information generated by a plurality of sensing modules associated with the application.

At 704, a user selection of one or more responses on a UI is facilitated by the computing device for an interactive learning profile test from the server system.

At 706, the collection of user information and the user selection of one or more responses is sent to the server system. The server system is configured to determine the context based information from the collection of user information based at least on a learning profile of the user. The learning profile corresponds to the one or more responses. Further, the server system is configured to analyse the user information based on a location of the user, a physiological state of the user, a current and past activity of the user and an audiovisual information of the user to determine the context based information.

At 708, the context based information from the server system is received. In an example scenario of a workspace environment, the server system may enable an employee to receive various context based information about a group of his colleagues on his computing device such as each colleague's work position title, work groups, work skills, list of current assignments, work completion percentage, expected work completion date, upcoming out of office dates and the like.

At 710, the context based information in an augmented reality view through the UI of the computing device in the application is facilitated. In the example scenario of the workspace environment mentioned above, the employee using the application such as the AR networking application 204 on his computing device may be enabled to view context based information of the group of his colleagues simultaneously located proximate to each colleague's head through the UI in order for the employee to know which information pertains to which colleague.

The disclosed methods 500-700 or one or more operations of the methods 500-700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing systems and methods for increasing social interactions and learning capabilities of the users by bringing online social and learning networks into the real world through augmented reality. The system analyzes information based on location, time, day, weather, smell, mood, physical condition, past experience, previous actions, learning profiles, personality, strengths, weaknesses and the like to analyze the context before it suggests to the users what to say, what not to say, what to do, what not do before/during/after real life interactions/encounters. The user can create an artificial companion using the application that can interact with the user and guide the user to navigate a real world environment with increased capabilities (specifically for handicap users). The system facilitates more than only conducting better conversations. For example, the system facilitates the user to take better actions (such as staying healthier) or avoids actions (such as avoiding junk food late at night) by tracking habits of the user. As another example, the system is configured to suggest pronunciation improvement techniques to a student in real time by analyzing the mouth movement of the student and by comparing the pronunciation with a pronunciation learning profile received from a teacher. Further, the system facilitates the teacher to view the student's mouth movements to pronounce words in real time. The system also enables various third party websites to provide a variety of services to their users using the application. More particularly, the users may be enabled to access user accounts or public user profiles of the websites, interact with other members of the websites, transmit messages, upload files (e.g., photographs, videos), purchase goods/services or access information/content posted on the websites.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the server system 110 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIGS. 5-7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    receiving, by a server system, a collection of user information generated from an application in a computing device of a user, the collection of user information comprising information generated by a plurality of sensing modules associated with the application;
    determining, by the server system, a context based information from the collection of user information, the context based information generated based at least on a learning profile of the user;
    provisioning, by the server system, the context based information in an augmented reality view through a User Interface (UI) of the computing device in the application;
    facilitating, by the server system, rendering of an interactive virtual object to be displayed in the augmented reality view through the UI of the computing device, wherein an appearance of the interactive virtual object is changed dynamically based at least on the information generated by the plurality of sensing modules associated with the application;
wherein the interactive virtual object is configured to move in a field of view of a display of the computing device and stimulate the user to think about a displayed problem instead of simply showing the correct answer; and
wherein rendered virtual objects pertaining to one user are configured to interact with rendered virtual objects pertainingto other users in a surrounding environment in the augmented reality view through the UI of the computing device.

2. The method of claim 1, wherein the learning profile corresponds to one or more responses provided by the user for an interactive learning profile test displayed on the UI, the one or more responses utilized to determine the context based information.

3. The method of claim 1, wherein the collection of user information further comprises a profile data of the user'generated by facilitating a profile creation of the user based on a user request generated from the UI, the profile data comprising personal information of the user.

4. The method of claim 1, wherein receiving the collection of user information further comprises:
sending an access request on the UI of the computing device for accessing a social network information of the user; and
fetching the social network information of the user based on approval of the access request.

5. The method of claim 1, further comprising:
facilitating sharing of the context based information with a plurality of users through a plurality of UIs of a plurality of computing devices associated with the plurality of users.

6. The method of claim 1, further comprising:
receiving a search query from the UI of the computing device; and
facilitating a notification reply corresponding to the search query on the UI.

7. The method of claim 1, wherein the plurality of sensing modules further comprises an audiovisual capture module, a physiological module, an interactive virtual object creation module, an activity capture module, and a location module.

8. The method of claim 1, wherein determining the context based information further comprises performing at least one of:
analysing the user information based on a location of the user;
analysing the user information based on a physiological state of the user;
analysing the user information based on a current and past activity of the user; and
analysing the user information based on an audiovisual information of the user.

9. The method of claim 1, wherein determining the context based information further comprises utilizing a plurality of communication patterns of the user, a semantic examination, a statistical breakdown, and natural language processing.

10. A server system, comprising:
at least one processor;
a communication interface, controlled by the at least one processor, to communicate with a computing device; and
a memory having stored therein machine executable instructions, that when executed by the at least one processor, cause the server system to:
receive a collection of user information generated from an application in the computing device of a user, the collection of user information comprising information generated by a plurality of sensing modules associated with the application;
determine a context based information from the collection of user information, the context based information generated based at least on a learning profile of the user;
provision the context based information in an augmented reality view through a User Interface (UI) of the computing device in the application;
facilitate rendering of an interactive virtual object to be displayed in the augmented reality view through the UI of the computing device, wherein an appearance of the interactive virtual object is changed dynamically based at least on the information generated by the plurality of sensing modules associated with the application;
wherein the interactive virtual object is configured to move in a field of view of a display of the computing device and stimulate the user to think about a displayed problem instead of simply showing the correct answer; and
wherein rendered virtual objects pertaining to one user are configured to interact with rendered virtual objects pertaining to other users in a surrounding environment in the augmented reality view through the UI of the computing device.

11. The server system of claim 10, wherein the learning profile corresponds to one or more responses provided by the user for an interactive learning profile test displayed on the UI, the one or more responses utilized to determine the context based information.

12. The server system of claim 10, wherein the collection of user information further comprises a profile data of the user generated by facilitating a profile creation of the user based on a user request generated from the UI, the profile data comprising personal information of the user.

13. The server system of claim 10, wherein for receiving the collection of user information, the server system is further cased to:
send an access request on the UI of the computing device for accessing a social network information of the user; and
fetch the social network information of the user based on approval of the access request.

14. The server system of claim 10, wherein the server system is further caused to:
facilitate sharing of the context based information with a plurality of users through a plurality of Ms of a plurality of computing devices associated with the plurality of users.

15. The server system of claim 10, wherein the server system is further caused to:
receive a search query from the UI of the computing device; and
facilitate a notification reply corresponding to the search query on the UI.

16. The server system of claim 10, wherein the plurality of sensing modules further comprises an audiovisual capture module, a physiological module, an interactive virtual object creation module, an activity capture module, and a location module.

17. The server system of claim 10, wherein for determining the context based information, the server system is further caused to:
- analyse the user information based on a location of the user;
- analyse the user information based on a physiological state of the user;
- analyse the user information based on a current and past activity of the user; and
- analyse the user information based on an audiovisual information of the user.

18. A computer-implemented method, comprising:
- facilitating, by a computing device, a collection of user information of a user generated from an application available at the computing device, wherein the application is managed by a server system, and wherein the collection of user information comprises information generated by a plurality of sensing modules associated with the application;
- facilitating, by the computing device, a user selection of one or more responses on a User interface (UI) for an interactive learning profile test from the server system;
- sending, by the computing device, the collection of user information and the user selection of one or more responses to the server system,
- wherein the server system is configured to determine the context based information from the collection of user information based at least on a learning profile of the user, the learning profile corresponding to the one or more responses;
- receiving, by the computing device, the context based information from the server system;
- facilitating, by the computing device, the context based information in an augmented reality view through the UI of the computing device in the application;
- facilitating, by the computing device, rendering of an interactive virtual object to be displayed in the augmented reality view through the UI of the computing device, wherein an appearance of the interactive virtual object is changed dynamically based at least on the information generated by the plurality of sensing modules associated with the application;
- wherein the interactive virtual object is configured to move in a field of view of a display of the computing device and stimulate the user to think about a displayed problem instead of simply showing the correct answer; and
- wherein rendered virtual objects pertaining to one user are configured to interact with rendered virtual objects pertaining to other users in a surrounding environment in the augmented reality view through the UI of the computing device.

* * * * *